United States Patent
Gehrke

(10) Patent No.: US 7,701,189 B2
(45) Date of Patent: Apr. 20, 2010

(54) DYNAMIC GATE DRIVE VOLTAGE ADJUSTMENT

(75) Inventor: Dirk Gehrke, Freising (DE)

(73) Assignee: Texas InstrumentsDeutschland GmbH, Freising (DE)

( * ) Notice: Subject to any disclaimer, the term of this patent is extended or adjusted under 35 U.S.C. 154(b) by 35 days.

(21) Appl. No.: 12/105,121

(22) Filed: Apr. 17, 2008

(65) Prior Publication Data

US 2008/0258697 A1    Oct. 23, 2008

(51) Int. Cl.
   *G05F 1/00* (2006.01)
(52) U.S. Cl. .................................. 323/285; 323/283
(58) Field of Classification Search .............. 323/272, 323/282, 283, 284, 285, 286
   See application file for complete search history.

(56) References Cited

U.S. PATENT DOCUMENTS

| | | | |
|---|---|---|---|
| 6,341,073 B1 | 1/2002 | Lee | |
| 2005/0213267 A1 | 9/2005 | Azrai et al. | |
| 2006/0038547 A1* | 2/2006 | Ahmad | 323/284 |
| 2008/0001553 A1 | 1/2008 | Qiu et al. | |
| 2008/0007241 A1* | 1/2008 | Isham | 323/285 |
| 2008/0061757 A1* | 3/2008 | Khayat et al. | 323/283 |

FOREIGN PATENT DOCUMENTS

| | | |
|---|---|---|
| DE | 10349696 | 5/2004 |
| JP | 01157270 | 6/1989 |
| WO | WO 0150213 | 7/2001 |
| WO | 2006/053339 A2 | 5/2006 |

* cited by examiner

*Primary Examiner*—Adolf Berhane
*Assistant Examiner*—Matthew Grubb
(74) *Attorney, Agent, or Firm*—John J. Patti; Wade J. Brady, III; Frederick J. Telecky, Jr.

(57) ABSTRACT

A DC-DC buck converter comprises a high-side power FET having a current path connected in series between an input terminal and an inductor connected to an output terminal supplying an output current to a load. The converter further comprises a low-side power FET having a current path connected between a reference terminal and an interconnection node of the high-side power FET with the inductor. The converter has a pulse width modulation controller receiving a feedback signal from the output terminal and providing pulse width modulated signals, and a gate driver circuit that receives the pulse width modulated signals from the pulse width modulation controller and applies pulse width modulated drive signals to the gates of the power FETs. The gate driver circuit supplies the drive signals to the gates of the power FETs at a variable voltage level adjusted in response to at least the output current, minimizing the power dissipation of the gate driver circuit.

12 Claims, 1 Drawing Sheet

DYNAMIC GATE DRIVE VOLTAGE ADJUSTMENT

This application claims priority from German Patent Application No. 10 2007 018 028.6, filed 17 Apr. 2007, the entirety of which is hereby incorporated herein by reference.

FIELD OF THE INVENTION

The invention relates to a DC-DC buck converter with a high-side power FET, a low-side power FET and a gate driver circuit that applies pulse width modulated drive signals to the gates of the power FETs with an optimized efficiency. For high output current applications, the power FETs are external to the driver which is implemented as an integrated CMOS circuit.

BACKGROUND

Conventional buck converters are operated at a fixed supply voltage, switching the power FETs at a given frequency. More advanced drivers allow operation over a range of supply voltages.

It is always a concern to improve the efficiency of power converters.

SUMMARY

It has now been found that substantial improvements can be achieved by adjusting the gate drive voltage of the power FETs in response to the converter's output current. For optimum efficiency, the gate drive voltage is a non-linear function of the output current. This is a surprising discovery because it is well known that the power dissipation of an FET driver is proportional to the gate drive voltage.

In accordance with a described embodiment of the invention, a DC-DC buck converter is provided that comprises a high-side power FET, having a current path connected in series between an input terminal and an inductor connected to an output terminal supplying an output current to a load. The described converter further comprises a low-side power FET, having a current path connected between a reference terminal and an interconnection node of the high-side power FET with the inductor. The converter has a pulse width modulation controller receiving a feedback signal from the output terminal and providing pulse width modulated signals, and a gate driver circuit that receives the pulse width modulated signals from the pulse width modulation controller and applies pulse width modulated drive signals to the gates of the power FETs. The gate driver circuit supplies the drive signals to the gates of the power FETs at a variable voltage level adjusted in response to at least the output current, minimizing the power dissipation of the gate driver circuit. For example, with a fixed input supply voltage of 12V and an output voltage of 1.3V, the highest efficiency is achieved at a gate drive voltage of 5V for an output current up to 30 A. However, for an output current from 30 to 53 A, best results are achieved with a gate drive voltage of 6V, and for an output current in a range of 53 up to 120 A, the optimum gate drive voltage is 7V.

In a practical implementation, the gate drive voltage is adjusted in very small steps which are determined by an application specific integrated circuit (ASIC), a microcontroller (µC), a digital signal processor (DSP), a field programmable gate array (FPGA), or any other kind of controller. The controller may capture the input and output voltage and current information to calculate the input power and the output power. This information is used to determine the efficiency and to adjust the gate drive voltage to maintain the overall efficiency of the converter at its maximum value.

In another implementation, just the output current and output voltage are used as inputs to determine an optimum gate drive voltage.

BRIEF DESCRIPTION OF THE DRAWINGS

Further advantages and features of the invention will become apparent from the following detailed description of example embodiments, considered with reference to accompanying drawings, wherein.

DETAILED DESCRIPTION OF EXAMPLE EMBODIMENTS

Figure 1:
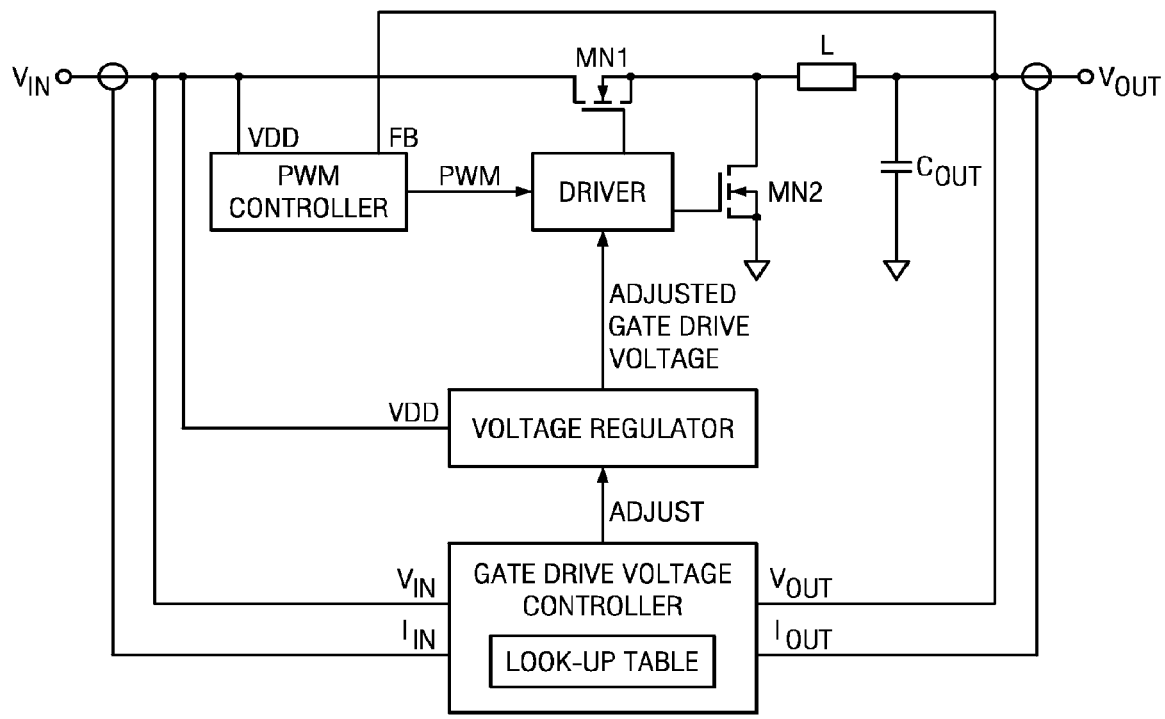
FIG. 1 is a block diagram of a single phase in the inventive DC-DC buck converter.

In FIG. 1, an n-channel power FET MN1 has its current path connected in series with an inductor L between an input voltage terminal Vin and an output voltage terminal Vout. The interconnection node between the transistor MN1 and the inductor L is connected to the drain of another n-channel power FET MN2 which has its source connected to ground. A charge capacitor Cout is connected between the output terminal Vout and ground. The gates of power transistors MN1 and MN2 are driven by gate drive signals of mutually opposite phases from a gate driver. The gate driver in turn has an input from a pulse width modulation (PWM) controller which receives a supply voltage VDD from the input terminal Vin and a feedback signal FB from the output terminal Vout.

In a conventional converter, the gate driver uses a fixed supply voltage for providing the gate drive signals at a constant voltage level. In the illustrated embodiment, however, the gate driver receives an adjusted gate drive voltage from a voltage regulator. The voltage regulator may take the form of a low dropout (LDO) regulator, a DC-DC converter, or other kind of linear voltage regulator. The voltage regulator—whatever its implementation—receives a supply input from terminal Vin at the level VDD and a control input "Adjust" from a gate drive voltage controller.

The gate drive voltage controller may be any type of controller: PC, DSP, ASIC, etc. In the shown embodiment, inputs to the gate drive voltage controller are the output current Iout, the output voltage Vout, the input voltage Vin and the input current Iin. The current values can be measured by simply inserting a sense resistor in the current path. For the output current it is also possible to measure the voltage drop across the inductor. From this information (current and voltage values), the controller can compute the input power and the output power and, of course, the overall efficiency of the converter. The controller determines and provides the "Adjust" control signal to the voltage regulator in response to the output current Iout, so as to maximize the overall efficiency of the converter.

Figure 2:
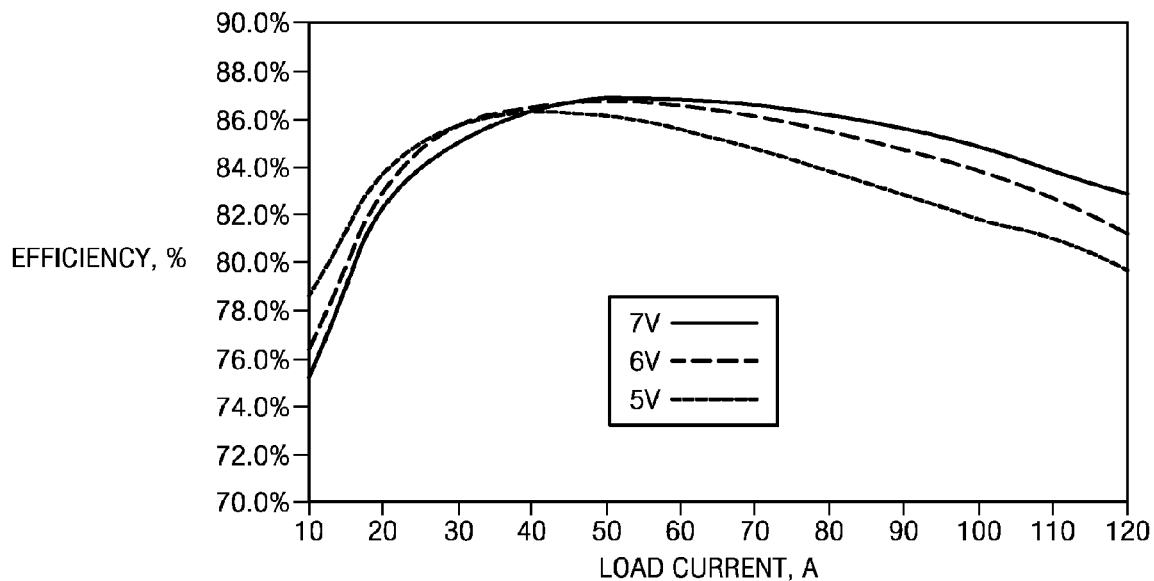
FIG. 2 is a plot of the efficiency versus output current in a 4-phase DC-DC buck converter for three different values of gate drive voltage.

With reference to FIG. 2, it is seen that the efficiency for each of three different gate drive voltage levels 5V, 6V and 7V is a non-linear function of the output current. In an example, given for the purpose of explaining the principles of the invention, having a fixed input voltage Vin of 12V and an output voltage Vout of 1.3V, the highest efficiency for an output current of up to 30 A is achieved with a gate drive voltage of only 5V; for an output current of from 30 A to 53 A, best results are obtained with 6V; and for an output current of from 53 A to 120 A, the highest efficiency is achieved with a gate driver voltage of 7V.

In example practical implementations, the gate drive voltage controller may adjust the gate drive voltage in very fine steps to maximize the efficiency of the converter. The process of optimizing the efficiency may be software controlled with, for example, the software instructing the controller to calculate the overall efficiency and to tentatively adjust the gate drive voltage in a given sense by small steps for so long as the calculated efficiency increases.

In alternative implementations, where input voltage is assumed to be substantially constant, the gate drive voltage controller may be implemented to use only inputs from the output, i.e., the output voltage Vout and the output current Iout, with the controller simply determining the optimum "Adjust" value based on values derived from a look-up table. For applications with known input/output voltages the look-up table may be generated empirically. The solution with a look-up table needs only moderate performance on the side of the gate drive voltage controller. In a general purpose implementation, the gate drive voltage controller may have a learn mode in which the look-up table is generated.

In a plural phase converter, e.g., a four-phase buck converter, each phase would typically require a channel as shown in FIG. 1. Thus, the gate drive voltage would be individually adjusted in each channel. However, in an application where the load is well balanced between the channels, the gate drive voltage controller could be shared between all channels.

Those skilled in the art to which the invention relates will appreciate that the described implementations are merely example embodiments, and that many other implementations are possible within the scope of the claimed invention.

What is claimed is:

1. A DC-DC buck converter comprising:
   an input terminal;
   an output terminal for supplying an output current to a load;
   a reference voltage terminal;
   an inductor coupled to the output terminal;
   a high-side power FET having a current path coupled in series between the input terminal and the inductor;
   a low-side power FET having a current path coupled between the reference voltage terminal and node between the high-side power FET and the inductor;
   a pulse width modulation controller coupled to receive a feedback signal from the output terminal, for providing pulse width modulated signals; and
   a gate driver circuit coupled to receive the pulse width modulated signals from the pulse width modulation (PWM) controller and, responsive thereto, to apply pulse width modulated drive signals to gates of the high-side and low-side power FETs, wherein the gate driver circuit supplies the drive signals to the gates of the power FETs at a variable voltage level adjusted in response to at least the output current, in order to substantially minimize the power dissipation of the gate driver circuit;
   a gate drive voltage controller that is coupled to receive signals that are representative of an input voltage at the input terminal, an output voltage at the output terminal, an input current at the input terminal, and the output current, wherein the gate drive voltage controller generates an adjustment signal at least in part in response to the signals that are representative of the input voltage, the output voltage, the input current, and the output current; and
   a voltage regulator that is coupled to the gate drive voltage controller so as to receive the adjustment signal and that is coupled to the gate driver circuit so as to provide an adjusted gate drive voltage to the gate driver circuit based at least in part on the adjustment signal.

2. The converter of claim 1, wherein the gate drive voltage controller computes input power and output power and supplies the adjustment signal to the voltage regulator so as to substantially minimize the difference between the input power and the output power.

3. The converter of claim 2, wherein the gate drive voltage controller is implemented by at least one of a microcontroller, a digital signal processor, an application specific integrated circuit, and a field programmable gate array.

4. The converter of claim 1, wherein the gate drive voltage controller uses a look-up table to determine the substantially optimum gate drive voltage.

5. The converter of claim 4, wherein the gate drive voltage controller is configured for operation in a learn mode to generate the look-up table.

6. An apparatus comprising:
   an input terminal;
   a feedback terminal;
   a first switch that is coupled to the input terminal;
   a second switch that is coupled to the first switch at a switching node;
   a driver that is coupled to the first and second switches, wherein the driver actuates and deactuates each of the first and second switches;
   a PWM controller that is coupled to the feedback terminal and to the driver, wherein the PWM controller provide pulse width modulated signals to the driver;
   a gate drive voltage controller that is coupled to receive signals that are representative of an input voltage at the input terminal, the output voltage at an output terminal, an input current at the input terminal, and the output current at the output terminal, wherein the gate drive voltage controller generates an adjustment signal at least in part in response to the signals that are representative of the input voltage, the output voltage, the input current, and the output current; and
   a voltage regulator that is coupled to the gate drive voltage controller so as to receive the adjustment signal and that is coupled to the driver so as to provide an adjusted gate drive voltage to the driver based at least in part on the adjustment signal.

7. The apparatus of claim 6, wherein the first switch is an NMOS FET that is coupled to the input terminal at its drain, the switching node at its source and the driver at its gate.

8. The apparatus of claim 6, wherein the second switch is an NMOS FET that is coupled to the switching node at its drain and the driver at its gate.

9. The apparatus of claim 6, wherein the gate drive voltage controller computes input power and output power and supplies the adjustment signal to the voltage regulator so as to substantially minimize the difference between the input power and the output power.

10. The apparatus of claim 9, wherein the gate drive voltage controller is implemented by at least one of a microcontroller, a digital signal processor, an application specific integrated circuit, and a field programmable gate array.

11. The apparatus of claim 6, wherein the gate drive voltage controller uses a look-up table to determine the substantially optimum gate drive voltage.

12. The apparatus of claim 11, wherein the gate drive voltage controller is configured for operation in a learn mode to generate the look-up table.

* * * * *